Jan. 27, 1953   G. A. MATTESON, JR., ET AL   2,627,010
APPARATUS FOR SOLDERING METAL STRIPS
Filed Jan. 28, 1948   3 Sheets-Sheet 1
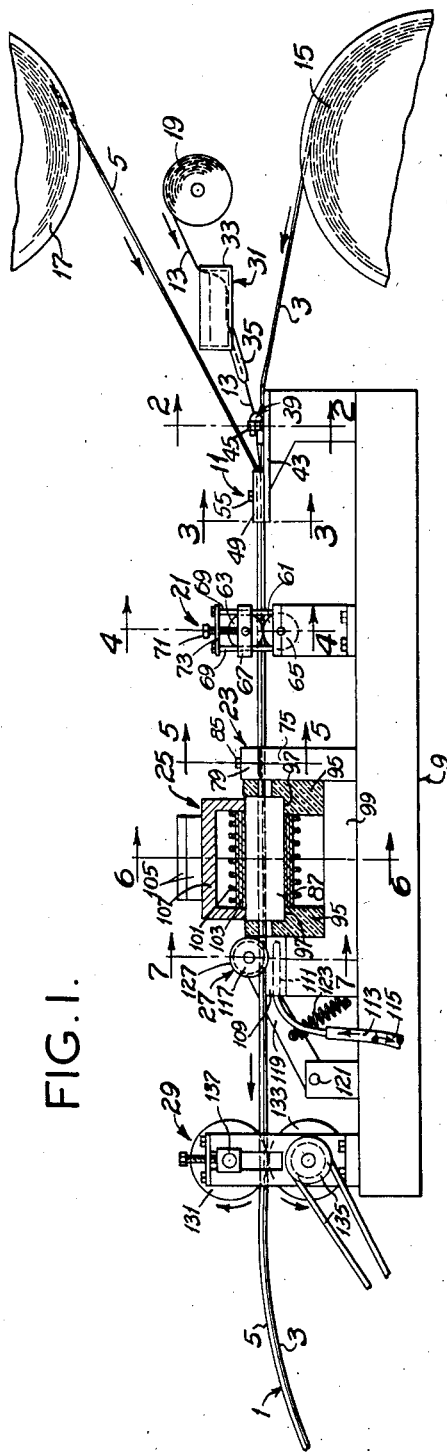
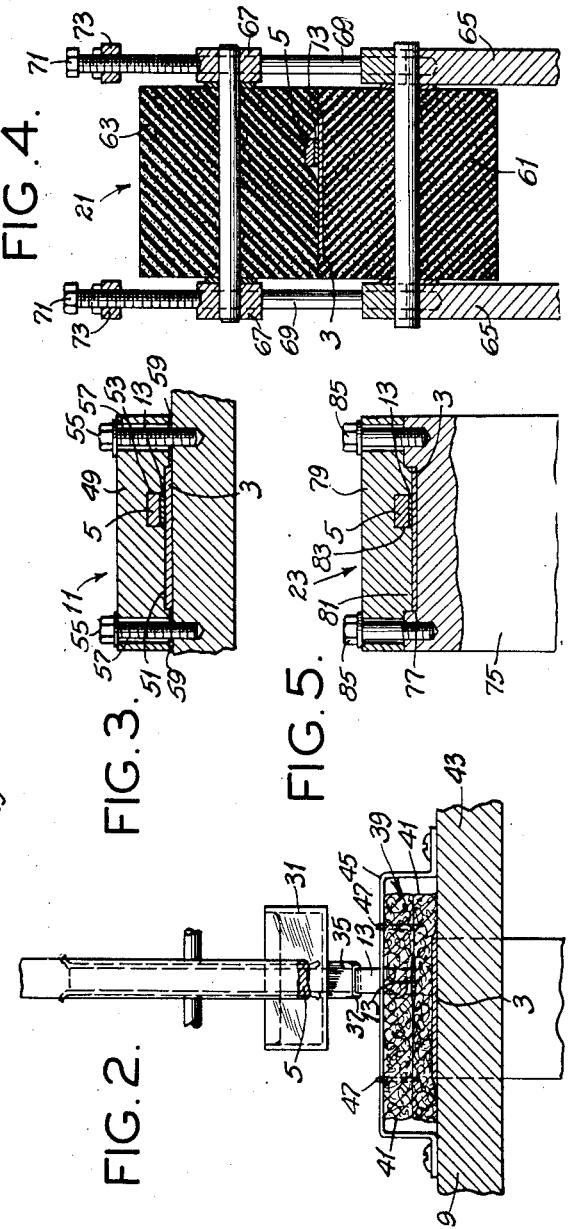

Jan. 27, 1953   G. A. MATTESON, JR., ET AL   2,627,010
APPARATUS FOR SOLDERING METAL STRIPS
Filed Jan. 28, 1948   3 Sheets-Sheet 2

Jan. 27, 1953  G. A. MATTESON, JR., ET AL  2,627,010
APPARATUS FOR SOLDERING METAL STRIPS
Filed Jan. 28, 1949  3 Sheets-Sheet 3
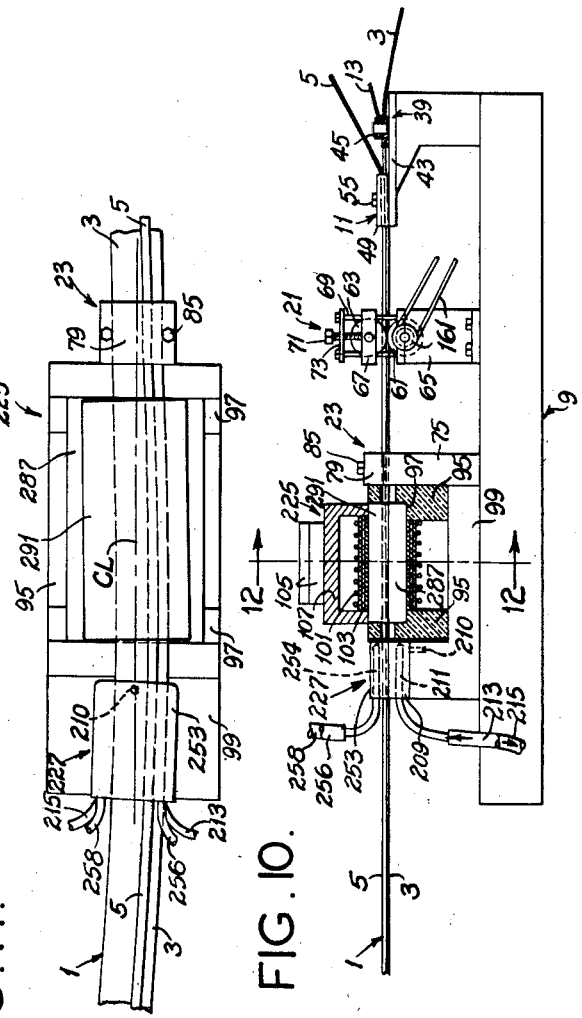
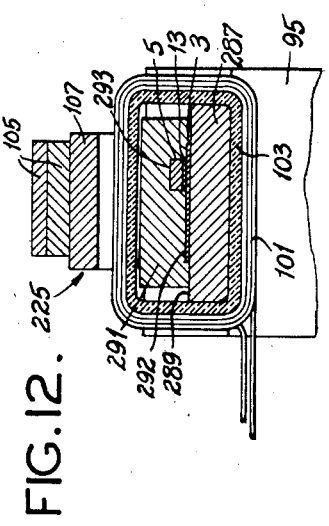

Patented Jan. 27, 1953

2,627,010

UNITED STATES PATENT OFFICE 2,627,010

APPARATUS FOR SOLDERING METAL STRIPS

George A. Matteson, Jr., Providence, R. I., Omer J. Rainville, Attleboro, Mass., and George I. Parker, Rumford, R. I., assignors to Metals & Controls Corporation, Attleboro, Mass., a corporation of Massachusetts Application January 28, 1948, Serial No. 4,758

7 Claims. (Cl. 219—12)

This invention relates to apparatus for soldering metal strips, and more particularly to such apparatus for making soldered composite metallic strip adapted to be sheared into electrical contact arms.

Among the several objects of the invention may be noted the provision of apparatus for continuous production of composite metallic strip consisting of a relatively narrow metallic strip soldered to a relatively wide metallic strip, particularly adapted to be sheared into electrical contact arms having raised local contact areas; the provision of apparatus of this class for continuously producing such composite strip without buckling or breaking of the narrow strip component; the provision of apparatus of this class embodying an electrical solder heater providing for close control of soldering temperature; and the provision of apparatus of this class adapted for continuous operation without becoming fouled by solder or flux. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a view in elevation and partly in section of an embodiment of the apparatus of this invention;

Fig. 2 is an enlarged section taken on line 2—2 of Fig. 1, illustrating a flux fountain and wiper;

Fig. 3 is an enlarged section taken on line 3—3 of Fig. 1, illustrating a strip guide;

Fig. 4 is an enlarged section taken on line 4—4 of Fig. 1, illustrating a set of pinch rolls;

Fig. 5 is an enlarged section taken on line 5—5 of Fig. 1, illustrating another strip guide;

Fig. 10 is a view similar to Fig. 1 illustrating an alternative embodiment of the apparatus of this invention;

Fig. 11 is a plan view of Fig. 10; and,

Fig. 12 is an enlarged section taken on line 12—12 of Fig. 10, illustrating the modified heating and pressing unit of the Fig. 10 apparatus.

Similar reference characters indicate corresponding parts throughout the several views of the drawings.

Figure 8:
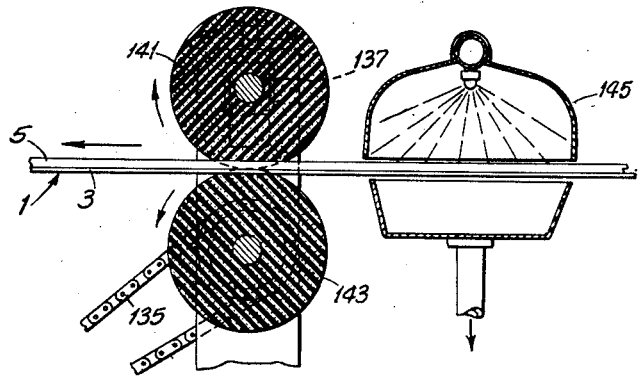
Fig. 8 is a fragmentary side elevation, partly in section, illustrating a modification.
Figure 9:
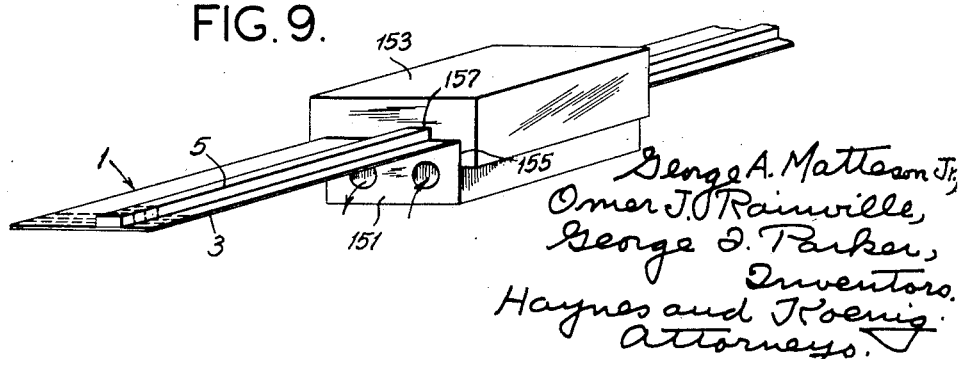
Fig. 9 is a perspective view illustrating a modification of the cooling unit.

Referring to the drawings, a portion of the length of a composite metallic strip, designated in its entirety by the reference character 1, is seen at the left of Figs. 1, 8 and 9 as it emerges from apparatus of this invention wherein it is formed. This composite strip 1 is shown to comprise a strip 3 of sheet metal having a metallic strip or ribbon 5, narrower than the strip 3, extending throughout the length of and bonded to one of the faces of strip 3 by solder 13. The ribbon 5 extends parallel to and adjacent one of the marginal edges of the strip 3. The soldering is continuous throughout the length of the ribbon. The ribbon 5 presents a surface raised above the face of the strip 3 to which it is bonded.

Such a composite metallic strip is particularly useful for making electrical contact arms. For such purposes, a strip 3 is a strip of bronze or other suitable metal which is a good electrical conductor. Ribbon 5 is a ribbon of silver or other metal suitable for contact points. By transversely shearing the composite strip 1 at closely spaced intervals, as indicated by the dotted lines in Fig. 9, the strip 1 may conveniently be divided into a plurality of narrow segments each of which is an individual electrical contact arm consisting of a length of bronze strip having a silver contact point.

Manufacture of such composite strip in a continuous process, wherein the strips are continuously fed from continuous supplies thereof and soldered together, presents difficulties. One of the primary difficulties arises because in heating the solder between the strips to its melting point or soldering temperature the narrow silver ribbon is necessarily heated to soldering temperature. At such temperature the silver ribbon is very weak in tension and easily broken. Another difficulty arises because of the difference in the coefficients of thermal linear expansion of the silver and bronze. Thus, when the bronze and silver strips are heated to the soldering temperature unequal linear expansions thereof may result in buckling and breaking of the weakened silver strip. Since the strips are travelling more or less rapidly, it is necessary to provide for heating them quickly to soldering temperature and at the same time to press them into intimate contact so that the melted solder will flow by capillarity into the strips for a strong bond. The strips must then be kept in contact until the solder has solidified so that the silver ribbon will not buckle and separate from the bronze strip. The soldering temperature must be closely controlled so that soldering throughout the length of the strips is assured, without overheating. It is also desirable to provide for spreading soldering flux on the strips without fouling the apparatus in which the composite strip is produced, and to avoid fouling of the apparatus due to excess solder.

This invention provides apparatus whereby the composite strip may be successfully continuously produced despite the above difficulties. In a first apparatus of this invention, a strip of bronze and a strip or ribbon of silver are continuously withdrawn from continuous supplies and combined with a continuous strip of solder therebetween. The solder strip is coated with a liquid flux prior to being sandwiched between the bronze and silver strips. The combined strips are fed forward through a predetermined path with the silver strip under little or no tension. This is accomplished in the first apparatus of the invention by positively pulling the bronze strip, which is relatively strong, and pressing the silver strip against the bronze strip so that the latter feeds the silver strip and takes all or at least most of the tension resulting from the pulling operation. As the strips travel continuously through this path, with the silver strip under little or no tension, heat and pressure are applied to melt the solder and press the strips into intimate contact. The pressure causes a minimum separation of the strips resulting in flow by capillarity of the melted solder in the joint. Pressure is applied to the strips to cause them to remain in contact until the solder has solidified, to avoid separation of the silver strip from the bronze strip by buckling. In a second apparatus of this invention, feeding of the combined strips through the predetermined path without tension is accomplished by pushing the combined strips therethrough, rather than pulling them, the remaining steps being the same as in the first.

Figs. 1–7 illustrate the first apparatus of this invention for continuous production of the above-described composite strip 1. The apparatus, in general, comprises a support such as a table 9. Adjacent one end of the table is mounted a strip guide 11 which receives bronze strip 3, silver ribbon 5 and a strip or ribbon of solder 13 from individual supplies of these materials such as the rolls 15, 17 and 19, respectively. The solder strip is of the same or substantially the same width as the silver ribbon. The guide 11 combines and preliminarily aligns the three individual strips with the solder strip sandwiched between the bronze strip and silver ribbon. The combined strips travel successively through a pinch roll unit 21, a strip guide 23 for final alignment, a heating press 25, a cooling press 27, and a pulling or draw roll unit 29, all mounted on the table 9.

The solder strip 13 unwinding from roll 19 travels first through a flux fountain 31. This fountain comprises a receptacle 33 containing a liquid flux. A spout 35 extends from the bottom of the receptacle. The spout has an opening 37 (Fig. 2) in its lower end having dimensions which are somewhat oversize with respect to the dimensions of the solder strip 13 so that the strip 13 travelling through the opening 37 will draw flux along with it by capillary action, without leakage of flux from the receptacle.

The solder strip 13, coated with flux from the flux fountain, then travels through a wiper 39 mounted on the end of the table 9 ahead of the guide 11. The wiper 39 comprises a folded or doubled piece of felt 41, or other suitable absorbent material, so arranged that the solder strip travels through an aperture in the fold and thence between the two layers of the felt (Fig. 2). The felt is fixed upon a platform 43 above the top of the table at the level of the pass plane of the roll units 21 and 29 by means of a clip 45. The upper layer of the felt is secured to the clip as by staples 47. The solder strip travels from the wiper to the strip guide 11. The bronze strip 3 unwinding from roll 15 travels between the lower layer of the felt 41 and the platform 43 to the guide 11.

The strip guide 11 consists of a guide block 49 (Fig. 3) which has a longitudinal notch 51 in its bottom for guiding the bronze strip 3 and a longitudinal notch 53 opening into notch 51 for guiding the silver ribbon 5 and the solder strip 13. The notch 53 is located transversely of the guide in position to align the silver ribbon and solder strip at the desired distance from the marginal edge of the bronze strip. The guide block is adjustably fixed on the platform by screws 55 extending loosely through oversize holes 57 in the sides of the block and threaded into the platform. Suitable shims 59 may be provided between the side margins of the bottom of the guide block and the platform, if desired. The bronze strip 3, the silver ribbon 5 and the solder strip 13 are brought together and preliminarily aligned in travelling through the guide 11, with the solder strip sandwiched between the bronze strip and silver ribbon. The combined strips then travel through the pinch roll unit 21.

The pinch roll unit comprises a pair of rolls 61 and 63 made of soft rubber or other suitable elastic material. The lower roll 61 of the pair is journalled in a pair of side frames 65 which extend upward from the table 9. The upper roll 63 is journalled in a pair of bearings 67 which are vertically slidable on posts 69 extending upward from the side frames. Screws 71 extending from the bearings 67 are threaded in caps 73 for the posts and may be turned to adjust roll 63 relative to roll 61 to regulate the pressure between the rolls.

From the pinch roll unit 21, the combined strips travel through the guide 23. This guide is for the purpose of accurately aligning and guiding the strips before they travel through the heating press 25. It comprises a pedestal 75 extending upward from the table having a longitudinal notch 77 (Fig. 5) in its top for guiding the bronze strip 3. A block 79 has a boss 81 fitting in the notch 77. The boss 81 has a notch 83 for guiding the silver ribbon 5 and solder strip 13. The block 79 is fixed on the pedestal by screws 85 extending through its side margins.

Figure 6:
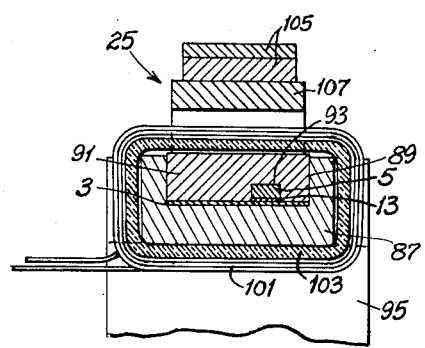
Fig. 6 is an enlarged section taken on line 6—6 of Fig. 1, illustrating a heating and pressing unit.
Figure 7:
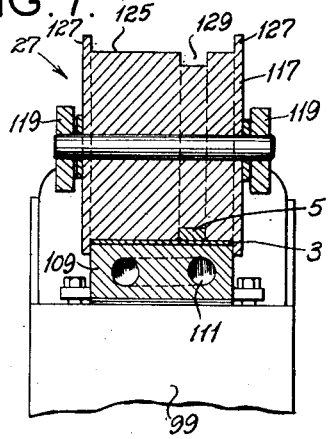
Fig. 7 is an enlarged section taken on line 7—7 of Fig. 1, illustrating a cooling unit.

The heating press 25, as illustrated in Figs. 1 and 6, is of the electrical induction type. It comprises a fixed bed 87 having a longitudinal, upwardly opening channel 89 for guiding the bronze strip 3. A pressure block 91 is vertically slidable in the channel, but has a sufficiently close sliding fit to avoid undue lateral play. The pressure block 91 has a longitudinal notch 93 in its bottom for guiding the silver ribbon 5 and solder strip 13. The combined strips travel through the channel 89 under the pressure block and are thereby pressed together against the bottom of the channel. The arrangement is also such that the combined strips travel through the heating press in intimate contact with the bed 87 and block 91 for transfer of heat by conduction from these elements to the strips.

The heating press bed 87 is supported at its ends upon a pair of pedestals 95 of any suitable heat-insulating material. The ends of the bed rest upon shoulders 97 of the pedestals and the bed bridges the space between the pedestals. The latter have walls extending upward from the shoulders across the ends of the bed, these walls being apertured for passage of the strips. The strip guide 23 is positioned against the right-hand pedestal as viewed in Fig. 1. The pedestals extend upward from a base 99 fixed on the table 9.

The press bed 87 and the pressure block 91 are formed of a material adapted to be heated to the temperature necessary for soldering purposes by electrical induction. Carbon is exemplary of such material. Silicon carbide may be used if a wear-resistant material is desired, provided the abrasive effect of silicon carbide on the strips passing through the heating press is of no moment. An induction coil 101 surrounds the bed 87 and the pressure block 91 for inductively heating them. The coil is electrically insulated from these elements by an insulating sleeve 103. The axis of the coil extends in the direction of travel of the strips.

If the pressure block 91 is not of sufficient weight for pressing the strips together, it may be weighted to increase the pressure on the strips travelling through the heating press by means of a weight 105 disposed upon a heat-insulating member 107 resting on the pressure block. The member 107 is of inverted channel-shape (Fig. 1) to accommodate the induction coil.

The cooling press 27 (Figs. 1 and 7) comprises a heat-exchange block 109 having a passage 111 for flow of a cooling liquid. The block is of substantially the same width as the bronze strip 3, and is fixed on the base 99 in position to have the bronze strip slide thereon as it travels out of the heating press. Cooling liquid is supplied to the passage 111 through a supply conduit 113, flows through the passage to cool the block, and then out through an exhaust conduit 115 (Fig. 1).

The strip issuing from the heating press is pressed downward against the heat-exchange block 109 by a spring-biased pressure roller 117. The latter is journalled at the free ends of a pair of arms 119 pivoted at 121 on the table 9. Arms 119 are biased downward by springs 123. The pressure roller 117 has a peripheral annular groove 125 (Fig. 7) slightly wider than the block 109 providing end flanges 127 which straddle the block so as to maintain the bronze strip 3 in alignment as it travels over the block. The roller 117 also has a smaller annular peripheral groove 129 opening into groove 125 for accommodating the silver ribbon 5.

The heat-exchange block 109 and the pressure roller 117 are formed of a material which will not be unduly heated by the high frequency field of the induction coil, and which is also a good conductor of heat for heat-exchange purposes. Brass is exemplary of such material. The elements of the guide 23 are also formed of such material so as not to be unduly heated by the field. The cooling press 27 comprising heat-exchange block 109 and roller 117 is located at such a distance from the exit end of the heating press that the roller does not pick up any excess solder that may have flowed out of the joint.

The composite strip 1 emerging from the cooling press travels through the pulling or draw roll unit 29 which functions to feed all the strips from the rolls 15, 17 and 19 through the apparatus and deliver the composite strip to other apparatus (not shown) for subsequent operations thereon. The pulling roll unit comprises upper and lower feed rolls 131 and 133, respectively, made of steel or the like. The lower roll is journalled on a fixed axis and is driven by any suitable drive, such as the belt and pulley drive 135. The upper roll is journalled in vertically adjustable bearings 137 and has a peripheral annular groove like the groove 129 of pressure roller 117 accommodating the silver ribbon.

Operation is as follows:

The pulling roll unit 29 is continuously driven to unwind the bronze strip 3, silver strip 5, and solder strip 13 from the supply rolls 15, 17 and 19 and pull the strips through the apparatus. The solder strip 13 travels first through the flux fountain 31 and picks up a coating of the liquid flux. It then travels through the wiper 39, the felt 41 of the wiper absorbing excess flux. The bronze strip travels first under the lower layer of felt 41 and its upper surface is thereby coated with flux which has been absorbed by the felt. The three strips are brought together and preliminarily aligned in the guide 11, the solder strip 13 being sandwiched between the bronze and silver strips. From the guide 11, the strips next travel through the pinch roll unit 21.

The pinch rolls 61 and 63 are driven by the travel of the strips therebetween. The upper pinch roll 63, being elastic, is deformed as illustrated in Fig. 4 by the silver strip 5 (and the solder strip 13 thereunder) so that it engages the upper surface of the bronze strip on opposite sides of the silver strip. The rolls 61 and 63 preferably are substantially wider than the bronze strip. The pressure between the rolls is regulated so that the lower roll 61 is also deformed as illustrated in Fig. 4 for mutual engagement of the peripheral side margins of the rolls laterally outward of the edges of the bronze strip.

Since the silver strip is much narrower than the bronze strip, the effect of the pinch rolls is to impart a positive forward feed to the silver strip so as to reduce to a minimum the tension which would otherwise be imparted to the silver strip by the action of the pulling roll unit 29. This occurs as follows: The bronze strip 3, being pulled between pinch rolls 61 and 63, causes these rolls to rotate at a speed corresponding to the linear speed of the bronze strip. The travel of the silver strip has little or no effect positively to rotate rolls 61 and 63 in relation to the travel of the bronze strip due to the narrow width of the silver strip as compared with the width of the bronze strip. In effect, the bronze strip functions as a driving member for positively driving both pinch rolls. The silver strip (with the solder strip) is pressed against the bronze strip by the upper roll and thereby fed forward. The elastic pinch rolls thus function to relieve the tension on the silver strip so that it may heat to soldering temperature without breaking. Use of elastic pinch rolls also compensates for unequal expansion of the strips due to their different coefficients of thermal expansion.

The strips then travel through the guide 23 which accurately aligns them just before they travel through the heating press 25. Guide 23 is positioned as close to the entrance end of the press as possible.

The bronze strip 3 slides through the heating press in contact with the bottom of the channel 89 in the press bed 87. The pressure block 91 rests on the silver strip 5 and presses it toward the bronze strip. The induction coil 101 is energized to produce a high frequency field inductively to heat the carbon bed 87 and pressure block 91 to a temperature sufficiently high to melt the solder. In practice, these elements become red hot. Heat is transferred by conduction from the bed and pressure block through the bronze and silver strips in contact therewith to the solder strip 13 to melt it. The pressure block (weighted by weight 105, if necessary) presses the silver strip against the bronze strip to squeeze the melted solder and cause the capillary flow of solder necessary to form a good soldered joint.

The relatively massive press bed 87 and pressure block 91 form a heat reservoir, thus tending to smooth out variations in heating effect which might otherwise be caused by fluctuations in the energization of the induction coil 101. That is, the bed and block have a relatively slow thermal response to variations in the strength of the high frequency field, and hence tend to remain at a substantially constant temperature. Thus, the soldering heat is closely controlled to assure uniform soldering of the strips throughout their length. In this respect, it may also be pointed out that if the strips were heated directly by induction, without the interposition of the carbon bed and block for heat transfer by conduction and heat storing purposes, sufficient heat for soldering purposes might not be inductively generated, and, of course, the heat-storing function of the bed and block would not be present. Flux from the strip travelling between the carbon press bed and pressure block tends to prevent the contact surfaces of these elements from losing their shape by oxidization.

The strips emerge from the heating press and travel through the cooling press 27. The bronze strip 3 travels over the heat-exchange block 109 in heat-transferring contact therewith. The pressure roller 117 presses down on the silver strip 5. The flanges 127 of the roller 117 are in contact with the sides of the block 109 for heat-transfer purposes. Thus, heat is transferred through the roller and the block to the cooling liquid circulating in the passage 111. We have found that the cooling press as herein described does not pick up solder from the strip. This may be due to the solder cooling to its freeze point in the relatively short interval that it takes the strip to travel from the exit of the heating press to the cooling press. Possibly the heat-exchange block and pressure roller are too cool to pick up solder. In any event, the roller 117 is so spaced from the heating press exit that it does not pick up any excess solder that has flowed from the joint. The roller may be made suitably adjustable so that this spacing may be readily determined by trial.

Thus, the apparatus functions to feed the combined bronze, silver and solder strips through the heating press with the silver strip under a tension less than its ultimate strength at soldering temperature to avoid breaking it. Unequal thermal expansion of the strips is compensated for, and buckling of the silver strip is avoided. The strips are quickly heated by the inductive heater to a closely controlled soldering temperature and pressed together to obtain a good bond. The cooling press keeps the strips in contact until the solder has solidified to prevent buckling and separation of the silver strip. At the same time, it is not fouled by excess solder.

Under some circumstances, use of metallic pulling rolls 131 and 133 is disadvantageous since such hard rolls may roll dirt or flux particles into the relatively soft silver component of the composite strip. To avoid this, the pulling rolls may be made of rubber or other suitable soft elastic material, as illustrated at 141 and 143 in Fig. 8. Such rubber rolls would be burned by the composite strip, as the strip is fairly hot even though it has travelled through the cooling press. To avoid burning, the strip travels through a cooling spray chamber 145 prior to travelling through the pulling rolls.

Also, under some circumstances the cooling press, in order not to pick up excess solder, must be located an appreciable distance from the exit end of the heating press. This provokes buckling and separation of the silver strip. In such case, a cooling press such as illustrated in Fig. 9 is used. This press comprises a heat-exchange block 151 like the block 109, but the pressure roller 117 is replaced by an elongate pressure block 153 of steatite or the like, or with a brass or copper (or the like) pressure block which is provided with cooling means such as is shown for block 109. This block 153 has a longitudinal channel 155 in its bottom fitting the heat-exchange block, and a longitudinal groove 157 opening into the channel accommodating the silver strip 5.

The press bed 87 and the pressure block 91 of the heating press 25 may be heated by passing current directly through them, instead of by heating them inductively. In such case, suitable electrode connections to the bed and block would be made, as will be readily understood.

Under some circumstances, the composite strip travelling through the heating and cooling presses tends to have a slight lateral curvature due to its being heated in the heating press and also due sometimes to an inherent tendency of the strip to curve in this manner. If this occurs, the strip may bind in one or the other of the presses since it is confined against lateral movement as it travels through them.

Figs. 10–12 illustrate an alternative embodiment of the apparatus of this invention wherein the heating and cooling presses are modified over the presses previously described so as to permit the composite strip to assume any lateral curvature required as it travels through the presses in order to avoid binding. Figs. 10 and 12 also illustrate a modified strip feeding means wherein the combined strips are pushed rather than pulled through the presses so as to relieve the tension on the silver strip to avoid breaking it.

The apparatus of Figs. 10–12 is substantially the same as that of Figs. 1–7 except for modifications in the construction of the heating and cooling presses and omission of the draw roll unit 29, pinch rolls 61 and 63 being positively driven for strip feeding purposes. As illustrated in Fig. 10, the lower pinch roll 61 is positively driven as by the belt and pulley drive 161. The pinch rolls thus function to push the combined strips 3, 5 and 13 through the heating and cooling presses.

This eliminates tension on the strips resulting from their being pulled by the pinch rolls from the supply rolls and through the flux fountain, wiper and the guide 11.

The heating press of the apparatus of Figs. 10–12, designated 225 in its entirety, differs from the heating press 25 of Fig. 6 in the construction of the press bed and pressure block, otherwise being the same. The press bed of heating press 225 is designated 287. It has no channel for confining the bronze strip 3, but has a substantially flat horizontal upper surface 289 upon which the strip 3 may slide laterally should it have any tendency to curve laterally. The pressure block of heating press 225 is designated 291. It has a longitudinal channel 292 in its bottom slightly wider than the width of the bronze strip 3 for guiding the bronze strip and a longitudinal notch 293 opening into channel 292 for guiding the silver ribbon 5 and solder strip 13 in proper relation to the bronze strip. The length of the pressure block is somewhat less than the distance between opposing faces of the upper portions of pedestals 95 so that the pressure block is free to slide laterally on the press bed to conform to any slight curvature of the strips, as illustrated in somewhat exaggerated fashion in Fig. 11.

The cooling press of the apparatus of Figs. 10–12, designated 227 in its entirety, comprises a heat exchange block 209, similar to block 109, having a passage 211 for flow of a cooling liquid. Block 209 is pivoted at its end adjacent the heating press on a vertical pivot 219 extending upward from base 99. The axis of the pivot is on the center line of the block 209 and on the center line CL of the entire apparatus. Cooling liquid is supplied to passage 211 through a flexible conduit 213 and exhausted through a flexible conduit 215. A pressure block 253 bears on the block 209, having a longitudinal channel in its bottom fitting block 209 and a longitudinal groove opening into the channel for accommodating the silver strip 5 in the same manner as pressure block 153. Pressure block 253 is provided with a passage 254 for flow of cooling liquid, supplied and exhausted through flexible conduits 256 and 258.

If the strips have any tendency to curve laterally as they travel through heating press 225 and cooling press 227, the presses adjust themselves to allow for such curvature so that the strips will not bind in the presses. Thus, pressure block 291 of the heating press is free to move laterally to follow the strips as they curve, and the entire cooling press 227 is free to pivot laterally on pivot 252 for the same purpose. The path of the strips is determined only at two points, namely the guide 23 at the entrance to the heating press and the pivot 219, rather than by three points as in the case of the apparatus of Fig. 1, and hence the strips are free to curve and will not bind. While the portions of the strips within the channels of the pressure blocks 291 and 253 are confined against curving, the play within each block, and the individual lengths of these blocks are sufficiently short in relation to the arc of curvature of the strips that the strips do not bind.

It will be readily understood that the heating and cooling presses of the Fig. 10 embodiment may be substituted for the heating and cooling presses of the Fig. 1 embodiment. It will also be understood that the pushing type strip feeding means of the Fig. 10 embodiment may be substituted for the pulling type of strip feeding means of the Fig. 1 embodiment.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A heating press for use in soldering apparatus of the type wherein continuously travelling metal strips having solder therebetween are to be soldered together, comprising a fixed press bed formed of carbon so as to be heatable by electrical induction, a pressure block also formed of carbon so as to be heatable by electrical induction and adapted to bear against the strips and press them against the bed, and an induction coil surrounding the bed and the block for inductively heating them, the axis of the coil extending in the direction of travel of the strips, the bed and block being of sufficient mass to have a slow thermal response to variations in the strength of the field of the induction coil so as to avoid wide variations in the temperature of the press, the bed having a surface on which the strips slide from one end of the bed to the other and the block having a surface for slidably bearing against the strips, said surfaces being shaped to fit the cross section of the strips passing through the press.

2. A heating press as set forth in claim 1 wherein the press bed has an upwardly opening channel therein, the strips sliding on the bottom of the channel, and the pressure block is vertically slidable in the channel and has a longitudinal notch in its bottom narrower than the channel and extending its full length.

3. A heating press as set forth in claim 1 wherein the pressure block rests loosely on the bed and is laterally slidable thereon, the pressure block having a longitudinal channel in its bottom for guiding a wide strip and a longitudinal notch opening into the channel for guiding a narrow strip.

4. Apparatus for soldering together two continuous metal strips having different coefficients of thermal expansion comprising a support, means on the support for holding a roll of each strip and a roll of strip solder, feeding means for the said metal and solder strips on the support forward of the roll holding means consisting of a set of soft rubber pinch rolls and means for driving only one of said pinch rolls, and a heating press on the support forward of the feeding means comprising a flat-surfaced press bed, a pressure block, and means for heating said bed and block.

5. Apparatus as set forth in claim 4, further comprising a cooling press for cooling the combined strips as they emerge from the heating press.

6. Apparatus as set forth in claim 5 wherein the cooling press is mounted for pivotal movement in the plane of the strips.

7. Apparatus as set forth in claim 4 wherein the press bed and pressure block are made of carbon and are massive in relation to the strips to form a heat reservoir, and wherein the means for heating the bed and block comprises an induction coil surrounding the bed and block with its axis extending in the direction of travel of strips.

GEORGE A. MATTESON, Jr.
OMER J. RAINVILLE.
GEORGE I. PARKER.

REFERENCES CITED

The following references are of record in the file of this patent:

UNITED STATES PATENTS

| Number | Name | Date |
|---|---|---|
| 811,594 | Richardson | Feb. 6, 1906 |
| 1,096,512 | Lindhe | May 12, 1914 |
| 1,199,530 | Dirrach | Sept. 26, 1916 |
| 1,380,250 | Reymond | May 31, 1921 |
| 1,687,605 | Bundy | Oct. 16, 1928 |
| 1,725,465 | Manson | Aug. 20, 1929 |
| 1,764,271 | Leonard | June 17, 1930 |
| 1,893,380 | Uschman et al. | Jan. 3, 1933 |
| 1,946,428 | Preston | Feb. 6, 1934 |
| 1,956,464 | Palm | Apr. 24, 1934 |
| 1,978,235 | Summers | Oct. 23, 1934 |
| 2,061,850 | Roberts | Nov. 24, 1936 |
| 2,075,622 | Nehlsen | Mar. 30, 1937 |
| 2,194,283 | Kidd | Mar. 19, 1940 |
| 2,210,338 | Quarnstrom | Aug. 6, 1940 |
| 2,226,944 | Reeve | Dec. 31, 1940 |
| 2,234,214 | Young | Mar. 11, 1941 |
| 2,264,004 | Patterson | Nov. 25, 1941 |
| 2,280,689 | Denneen et al. | Apr. 21, 1942 |
| 2,284,504 | Wrighton et al. | May 26, 1942 |
| 2,406,310 | Agule | Aug. 29, 1946 |
| 2,448,690 | Storm | Sept. 7, 1948 |